3,250,774
DIAZINES AND PROCESS FOR THEIR
MANUFACTURE
Paul Schmidt, Therwil, Kurt Eichenberger, Basel, Albert Rossi, Oberwil, Basel Land, and Max Wilhelm, Basel, Switzerland, assignors to Ciba Corporation, New York, N.Y., a corporation of Delaware
No Drawing. Filed June 18, 1963, Ser. No. 288,596
Claims priority, application Switzerland, June 22, 1962, 7,532/62; May 31, 1963, 6,827/63
15 Claims. (Cl. 260—250)

The present invention provides a new process for the manufacture of 1:4-diazine compounds which contain in position 4 the organic radical of an alcohol and in position 3 a thioxo group, further contain in position 5:6 a fused-on ring and are unsubstituted in position 2 or contain there a hydroxyl group or oxo group or a possibly substituted hydrocarbon radical and which, when they contain in position 2 an oxo group, may be substituted in position 1 by the organic radical of an alcohol- and of their salts.

According to the new process a compound of the formula

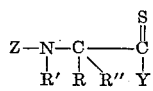

in which Z stands for a ring containing in ortho-position an amino group monosubstituted by the organic radical of an alcohol; R stands for hydrogen or a hydroxyl group or a possibly substituted hydrocarbon radical, and in which R' and R" together represent a second bond or R' stands for the organic radical of an alcohol and R and R" together represent an oxo group, and Y represents an amino group—is cyclised to form the diazine ring.

In the starting materials to be used in the present process Z stands, for example, for an alicyclic radical such as a cycloalkyl, for instance a cyclopentyl, cyclohexyl or cycloheptyl radical, or for an aromatic radical, preferably an at most binuclear group, such as a naphthyl, more especially a phenyl group, or for a heterocyclic radical which is linked to the nitrogen atom by a cyclic carbon atom vicinal to a further cyclic carbon atom, for example a pyrimidyl-4 or -5, pyridyl-2 or -3, pyrazolyl-3 or -4 or pyridazyl-3 or -4 radical.

The radical R is preferably hydrogen or a hydroxyl group. Particularly suitable as possibly substituted hydrocarbon radicals are possibly substituted lower aliphatic, cycloaliphatic, cycloaliphatic-aliphatic or aromatic or aromatic-aliphatic hydrocarbon radicals, such as suitable alkyl, alkenyl, cycloalkyl, cycloalkenyl, cycloalkyl-alkyl, cycloalkenyl-alkyl, aryl, aralkyl or aralkenyl radicals. As substituents which may be present in these radicals there may be mentioned, for example, for aliphatic radicals hydroxyl, alkoxy, halogen (such as chlorine or bromine), amino, alkylamino or dialkylamino; for cycloaliphatic radicals, for example alkyl, and for aromatic radicals, for example, hydroxyl, alkoxy, alkylenedioxy, alkyl, halogen, trifluoromethyl, nitro, amino or dialkylamino. The alkyl radicals in the above-mentioned groups are, more especially methyl, ethyl, straight or branched propyl, butyl, pentyl or hexyl radicals which may be bound in any desired position; as alkenyl radicals there may be mentioned above all allyl; as cycloalkyl radicals above all cyclopentyl, cyclohexyl or cycloheptyl; as cycloalkenyl radicals above all cyclopentenyl or cyclohexenyl; as aryl radicals more especially phenyl groups, and as aralkyl or aralkenyl radicals above all benzyl, α-phenylethyl, β-phenylethyl or phenylvinyl radicals. The above-mentioned organic radicals of an alcohol are, for example, possibly substituted hydrocarbon radicals, such as have been described above for R. Furthermore, they may also be heterocyclic radicals such as pyridyl, quinotyl or thienyl groups.

The amino group of the thioamide grouping may be unsubstituted; preferably, it is mono- or di-substituted for example by the substituents mentioned above for R, that is to say possibly substituted hydrocarbon radicals, more especially alkyl groups, or alkylene groups in which the alkylene chain may be interrupted by hetero atoms, such as oxa- or aza-alkylene radicals, for example butylene-(1:4), pentylene-(1:5), hexylene-(1:5), hexylene-(1:6), heptylene-(2:6), 3-oxa or aza-pentylene-(1:5), 3-methyl-3-ethyl- or 3-hydroxyethyl-3-aza-pentylene-(1:5), 3-aza-hexylene-(1:6) or 4-methyl-4-aza-heptylene-(2:6).

The cyclic radical Z may contain in addition to the amino group further substituents. If it is an alicyclic radical, it may also contain, for example, alkyl groups, for example those mentioned above. If it is aromatic or heterocyclic, it may carry, for example, the substituents mentioned above for phenyl radicals. For pyrimidyl radicals there may be mentioned more especially amino groups or hydroxyl or mercapto groups so that Z represents, for example, a 2:6-diamino-pyrimidyl-4 radical which carries in position 5 the radical X convertible into an amino group.

Of each of the aforementioned hydrocarbon radicals, whether or not the hydrocarbon radical is part of a lager radical, the lower hydrocarbon radical is preferred.

Preferred starting materials are α-(orthophenyl-amino-phenyl)-α-oxoacetic acid thioamides, above all those in which the amino group of the thioamide grouping is tertiary, for example a morpholino, piperidino, pyrrolidino, N-methyl-piperazino or dialkylamino group, in which the alkyl radicals may be, for example, those mentioned above.

The cyclisation is conducted by heating, advantageously in a solvent or diluent, and/or by treatment with an acidic agent. The starting material is preferably heated in a solvent or diluent with an acidic agent. Particularly suitable acidic agents are mineral or sulfonic acids, such as hydrochloric, sulfuric, a phosphoric or toluenesulfonic acid.

The starting materials are known or can be prepared by known methods. According to a particularly advantageous variant of the process for the manufacture of the new starting materials a compound of the formula

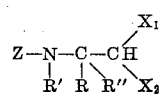

in which $X_1$ and $X_2$ each represents a free, etherified or esterified hydroxyl group, for example an alkoxy or alkanoyloxy group or a halogen atom or together represent an oxo group, and Z, R, R' and R" have the above meanings—is subjected to the Kindler reaction, that is to say treated with sulfur in the presence of ammonia or of an amine.

The invention includes also any variant of the present process in which an intermediate obtainable at any stage of the process is used as starting material and any remaining step/steps is/are carried out, or the process is discontinued at any stage thereof, or in which a starting material is formed under the reaction conditions or is used in the form of a hydrate or salt thereof.

Thus, there may be used as starting material compounds in which the radical Z contains instead of the mono-substituted amino group a substituent convertible thereinto, for example a mobile halogen atom, the said substituent being converted into the amino groups under conditions which as such bring about ring closure. Thus, for example, the above-mentioned halogen compounds may be heated with a suitable primary amine, whereupon the ring is closed, accompanied by elimination of hydrogen halide.

Some of the diazines defined above, obtained by the present process, are known. They are valuable intermediates, more especially for the manufacture of medicaments. However, compounds of this kind are also useful because of their pharmacological effects, more especially because of their diuretic and sodium-excreting action. They can therefore be used pharmacologically on animals or as diuretics.

Particularly valuable in this respect are the new compounds of the formula

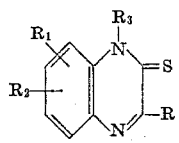

in which R has the above meaning and represents especially a hydroxyl group $R_1$ and $R_2$ represent hydrogen hydroxyl groups, lower alkoxy groups, alkylene-dioxy groups, lower alkyl groups, halogen atoms, nitro groups, amino groups or lower dialkylamino groups, and $R_3$ is the organic radical of an alcohol, and their salts.

Depending on the reaction conditions and starting materials used the final products of the present process are obtained in the free form or in the form of salts thereof. The salts of the new compounds can be converted into the free compounds in known manner, acid addition salts for example by reaction with a basic agent. On the other hand, when the final product is a free base, it can form salts with inorganic or organic acids. Acid addition salts are primarily prepared with therapeutically useful acids, for example hydrohalic acids, for instance hydrochloric or hydrobromic acid, perchloric, nitric or thiocyanic acid, sulfuric or phosphoric acids, or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic acid, embonic, methanesulfonic, ethanesulfonic, hydroxyethane-sulfonic, benzenesulfonic, para-toluenesulfonic, naphthalenesulfonic or sulfanilic acid, or methionine, tryptophan, lysine or arginine. The salts may be monosalts or polysalts. The salts may also be used for purifying the free bases.

The pharmacologically valuable new compounds are intended to be used as medicaments in the form of pharmaceutical preparations which contain said compounds together with organic or inorganic, solid or liquid pharmaceutical excipients suitable for enteral (for example oral) or parenteral administration. Suitable excipients are substances that do not react with the new compounds, for example water, gelatine, lactose, starches, magnesium stearate, talcum, vegetable oils, benzyl alcohols, gums, polyalkylene glycols, colesterol or other known medicinal excipients. The pharmaceutical preparations may be, for example, tablets, dragees or capsules, or in liquid form solutions, suspensions or emulsions. They may be sterilised and/or may contain assistants, such as preserving, stabilising, wetting or emulsifying agents, salts for regulating the osmotic pressure, or buffers. They may also contain other therapeutically valuable substances.

The new compounds may also be used in veterinary medicine, for example in one of the forms mentioned above, or in animal husbandry in the form of animal fodder or of additives to animal fodder. For this purpose the conventional extenders and diluents or animal fodder respectively are used.

The following examples illustrate the invention.

Example 1

A solution of 11 grams of α-[ortho-phenylaminoanilino]-α-oxoacetic acid thiomorpholide in 110 cc. of ethanol and 11 cc. of concentrated hydrochloric acid is refluxed for 40 minutes, then allowed to cool, and the precipitated product is suctioned off and crystallised from a large amount of ethanol, to yield 1-phenyl-2-thioxo-3-hydroxy-1:2-dihydroquinoxaline of the formula

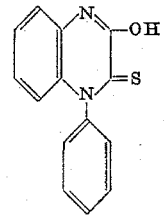

in yellow crystals melting at 298° C. with decomposition.

The starting material is prepared as follows: The reaction of ortho-aminodiphenylamine with dichloracetylchloride yields ortho-dichloracetylamino-diphenylamine melting at 94–95° C. which, on heating with sulfur and morpholine, furnishes α-[ortho-phenyl-amino-anilino]-α-oxoacetic acid thiomorpholide melting at 146–148° C.

Example 2

2 grams of α-[2-benzylamino-5-chloranilino]-α-oxoacetic acid thiomorpholide are heated in 50 cc. of absolute alcohol and 5 cc. of concentrated hydrochloric acid for 20 minutes on a water bath and then cooled. The precipitate is suctioned off and water is added to the filtrate until crystals begin to appear which are then recrystallised from ethanol+petroleum ether, to yield crystalline 1-benzyl-2-thioxo-3-hydroxy-6-chloro-1:2-dihydroquinoxaline of the formula

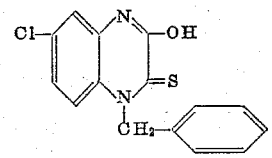

melting at 266–167° C.

The starting material is prepared as follows:

14.7 grams of dichloracetylchloride in 20 cc. of absolute dioxane are added dropwise to a solution, cooled to 10° C., of 2-benzylamino-5-chloraniline in 50 cc. of dioxane and 8 cc. of pyridine, and the mixture is stirred for 3 hours at room temperature. The reaction solution is then mixed with a large amount of water, and the precipitated crystals are recrystallised from alcohol, to yield 1-dichloracetylamino-2-benzylamino-5-chlorobenzene melting at 139–142° C.

12.9 grams of 1-dichloracetylamino-2-benzylamino-5-chlorobenzene are stirred without cooling into 40 cc. of morpholine and 1.7 grams of sulfur, with the temperature rising to about 90° C. The batch is stirred on for 3 hours, water is added, and the precipitated crystals are suctioned off and recrystallised from alcohol, water and alcohol+petroleum ether, to yield α-[2-benzylamino-5-chloranilino]-α-oxoacetic acid thiomorpholide melting at 182 to 184° C.

What is claimed is:

1. A process for the manufacture of 1:4-diazines which comprises intramolecularly condensing a cyclic compound, which carries at a ring-carbon atom a thiooxamoylamino group and at a carbon atom adjacent to the carbon atom carrying said thiooxamoylamino group a mono-substituted amino group by treatment with at least one member selected from the group consisting of heat and an acidic agent.

2. A process for the manufacture of 1:4 diazines, which comprises reacting a cyclic compound, which carries at a ring-carbon atom a thiooxamoylamino group and at a carbon atom adjacent to the carbon atom carrying said thiooxamoylamino group an activated halogen atom with ammonia and intramolecularly condensing the resulting compound by treatment with at least one member selected from the group consisting of heat and an acidic agent.

3. Process according to claim 1, wherein a starting material is used in which Z is a member selected from the group consisting of cycloalkyl, phenyl, pyrimidyl-(4), pyrimidyl-(5), pyridyl-(2), pyridyl-(3), pyrazolyl-(3), pyrazolyl-(4), pyridazyl-(3) and pyridazyl-(4), each carrying at a carbon atom in ortho-position an amino group mono-substituted by the organic radical of an alcohol, R stands for a member selected from the group consisting of hydrogen, hydroxyl and unsubstituted and substituted alkyl, alkenyl, cycloalkyl, cycloalkenyl, cycloalkyl-alkyl, cycoalkenyl-alkyl, aryl, aralkyl and aralkenyl, and Y stands for a member selected from the group consisting of dialkylamino, alkyleneimino, oxa-alkyleneimino, thia-alkyleneimino and aza-alkyleneimino.

4. Process according to claim 3, wherein the starting material is an α[o-phenylamino-anilino]-α-oxo-acetic acid-thioamide.

5. Process according to claim 4, wherein a corresponding member selected from the group consisting of a morpholide, piperidide, pyrrolidide, N-methyl-piperazide and dialkylamide is used as starting material.

6. Process according to claim 1, wherein cyclization is performed by heating and treatment with an acidic agent.

7. Process according to claim 1, wherein the starting materials are formed in situ.

8. Process according to claim 1, wherein the starting material is obtained by subjecting to the Kindler reaction a compound of the formula

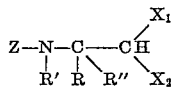

in which $X_1$ and $X_2$ each represents a member selected from the group consisting of free, etherified and esterified hydroxyl and when taken together form an oxo group and Z, R, R' and R'' have the meanings given in claim 1.

9. Process according to claim 5, wherein the starting material is treated with sulfur in the presence of a member selected from the group consisting of ammonia and an amine.

10. A compound of the formula

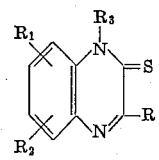

in which R represents a member selected from the group consisting of hydrogen, hydroxyl, lower alkyl, lower alkenyl, cyclopentyl, cyclohexyl, cycloheptyl, cyclopentenyl, cyclohexenyl, phenyl, phenyl-lower alkyl, phenyl-lower alkenyl, pyridyl, quinolyl and thienyl, $R_1$ and $R_2$ each represents a member selected from the group consisting of hydrogen, hydroxyl, lower alkoxy, lower alkyl, halogen, nitro, amino, lower dialkylamino and, when taken together, lower alkylenedioxy, and $R_3$ a member selected from the group consisting of lower alkyl, phenyl, phenyl-lower alkyl and cyclo-lower alkyl.

11. An acid addition salt of a compound claimed in claim 10.

12. A compound of the formula

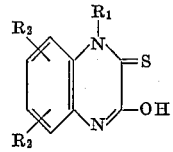

wherein $R_1$ and $R_2$ each represents a member selected from the group consisting of hydrogen, lower alkoxy, halogen, trifluoromethyl and, when taken together, lower alkylenedioxy, and $R_3$ stands for a member selected from the group consisting of lower alkyl, phenyl, phenyl-lower alkyl and cyclo-lower alkyl.

13. An acid addition salt of a compound claimed in claim 9.

14. 1 - Phenyl - 2 - thioxo - 3 - hydroxy - 1,2 - dihydro-quinoxaline.

15. 1 - Benzyl - 2 - thioxo - 3 - hydroxy - 6 - chloro-1,2-dihydro-quinoxaline.

References Cited by the Examiner

OTHER REFERENCES

Albert et al.: J. Chem. Soc., London part 3 (1962), page 3140.

HENRY R. JILES, *Acting Primary Examiner.*

UNITED STATES PATENT OFFICE
CERTIFICATE OF CORRECTION

Patent No. 3,250,774                              May 10, 1966

Paul Schmidt et al.

It is hereby certified that error appears in the above numbered patent requiring correction and that the said Letters Patent should read as corrected below.

Column 5, line 45, for the claim reference numeral "5" read -- 8 --; column 6, line 37, for the claim reference numeral "9" read -- 12 --.

Signed and sealed this 26th day of September 1967.

(SEAL)
Attest:

ERNEST W. SWIDER                         EDWARD J. BRENNER
Attesting Officer                             Commissioner of Patents